United States Patent [19]

Hallerback et al.

[11] 4,083,917
[45] Apr. 11, 1978

[54] ELECTRIC MACHINE AND METHOD FOR THE PRODUCTION THEREOF

[75] Inventors: Stig Lennart Hallerback, Vastra Frolunda; Leif Lachonius, Surte, both of Sweden

[73] Assignee: SKF Industrial Trading and Development Company B.V., Jutphaas, Netherlands

[21] Appl. No.: 694,934

[22] Filed: Jun. 11, 1976

[30] Foreign Application Priority Data

| Mar. 29, 1976 | Sweden | 7603723 |
| Jul. 7, 1975 | Sweden | 7507740 |

[51] Int. Cl.² .......................... B29C 5/04; B29F 1/00
[52] U.S. Cl. ................................. 264/263; 264/272; 264/311; 264/328
[58] Field of Search ............... 264/310, 311, 272, 263, 264/328; 425/430, 434; 164/286-290

[56] References Cited

U.S. PATENT DOCUMENTS

| 888,682 | 5/1908 | Ames et al. | 425/434 |
| 3,002,261 | 10/1961 | Avila et al. | 264/272 |
| 3,075,250 | 1/1963 | Strohm et al. | 264/272 |
| 3,084,418 | 4/1963 | Procopio | 264/272 |
| 3,087,201 | 4/1963 | Williams et al. | 264/328 |
| 3,638,055 | 1/1972 | Zimmerman | 264/272 |
| 3,754,071 | 8/1973 | Ernst et al. | 264/272 |
| 3,938,928 | 2/1976 | Andrews | 425/430 |

FOREIGN PATENT DOCUMENTS

| 1,052,069 | 3/1959 | Germany | 164/290 |
| 184,928 | 6/1936 | Switzerland | 164/290 |
| 3,197 of | 1809 | United Kingdom | 164/289 |

*Primary Examiner*—Willard E. Hoag
*Attorney, Agent, or Firm*—Eugene E. Renz, Jr.

[57] ABSTRACT

A method for making a stator for an electric machine which is simple, relatively inexpensive and permits mass production of motors having excellent operating characteristics including accurate centering of the rotor for silent and vibration-free function and efficient cooling of the windings and bearings. The method consists of the steps of supporting casings in a position surrounding the winding heads in sealing relation with opposite ends of a lamination stack, positioning a mandrel in the stator cavity having locating means engageable with the stator stack and means on its outer surface to define axial and radial locating positions for bearing shields. The casings, laminations and mandrel define a pair of enclosed cavities at opposite ends of the stator stack. A curable molding material is injected into the cavities by means of centrifugal force and thereafter the molding material is cured to complete the stator assembly.

12 Claims, 5 Drawing Figures

ELECTRIC MACHINE AND METHOD FOR THE PRODUCTION THEREOF

BACKGROUND OF THE INVENTION

The present invention relates to electric machines and preferably to machines having a slot-wound stator. The invention comprises a method for the production of such stators.

Alternating current induction motors and generators are usually made with slot-wound stators, the winding of which is fixed by immersing or dipping. The rotor is journalled in bearing shields which are centered on the outer diameter of the stator or in a housing combined with the stator. Usually the housing and the bearing shields make a closed motor housing, the outer side of which is cooled by a fan mounted at the end of the axis.

The market for smaller mass-produced induction motors is characterized by a tough price competition at the same time as the requirements on reliability and silent function are high.

This has given rise to an extended mechanization combined with a simplification of the construction of the motors. As a part of the effort for simplification and cost reduction one has during recent years made many attempts to mould in bearing shields and stator housings in one operation by moulding in the stator with plastic mass and at the same time impregnating the stator winding. The moulding methods which then have been used are injection moulding according to the transfer method, moulding according to the pressure-gel method, moulding under vacuum, and centrifugal moulding with moulds arranged outside the center on a rotating disc. None of these moulding methods have, however, given the combination of properties of the finished motor and the economy in the production method, that are required to get substantial advantages compared to existing conventional production methods.

If a motor having plastic moulded stator shall give sufficient advantages above conventional motors, the construction and the production method must fulfill the following conditions:

Accurate and durable centering of the rotor for obtaining a silent and vibration-free function;

Efficient cooling of the windings and bearings to make a high power output per material volume possible;

Guaranteed minimum distance between stator windings and touchable surface on the motor to fulfill the security regulations;

Complete and cavity-free impregnation of the whole stator winding;

Minimum consumption of plastic material;

Quick and reliable moulding method with reasonable machine investment; and

Minimum tool inventment and simple change between different lengths of the stators.

The above mentioned moulding methods have all that in common that they only partly fulfill these requirements. In no case the different requirements are fulfilledd to such an extent that the total production economy is satisfactory.

SUMMARY OF THE INVENTION

Through the present invention the above mentioned disadvantages have been eliminated by obtaining a method for the production of electric machines which is characterized in that:

(a) a centering mandrel shaped for obtaining guide surfaces for bearing shields is introduced into a package of laminations provided with windings;

(b) a bearing shield is optionally arranged at one end of the mandrel;

(c) Casings for plastic impermeable material are arranged around the winding heads so that the casings seal against the laminations at their outer periphery and by means of the mandrel, the laminations and optionally the bearing shield form two closed cavities, whereupon, (d) plastic is introduced into the cavities by means of centrifugal force and is finally cured.

The casings should consist of shape-retaining plastic and should be able to be united with the injected plastic when it is cured.

During injection of the plastic the stator may be rotated around its central axis.

The stator could also be rotated arond a central point on the axis of but outside the stator.

The plastic mass could be introduced through the mandrel into the lower part of the stator, the air then being pressed out through the holes for the electric wires.

It is also possible to let the plastic flow in through the mandrel at that part of the stator which is closest to the center of rotation.

Instead of rotating the stator around its axis or a point on the axis outside the stator it can be rotated around an axis which is parallel to the central axis but outside the stator.

One or more stators can then be removably mounted on a rotating disc.

The liquid plastic may in that case be introduced into the stator at its lower part via channels in the rotating disc.

Even when the stators are rotated around an axis parallel to the central axis it is possible to insert the plastic at the upper part of the stator via an air gap from a mouth piece. The air in the stator may then flow out through the same orifice as the one through which the plastic flows in.

The moulding mass which is used is not critical but it should suitably consist of epoxy plastic containing mineral fillers. The casing may consist of any suitable electrically isolating material. A preferable material is impact-resistant plastic.

According to the invention the moulding mass may be a magnetically conducting moulding plastic.

BRIEF DESCRIPTION OF FIGURES

The invention will be described more in detail in the following in connection with the attached drawings, wherein.

DESCRIPTION OF SPECIFIC EMBODIMENTS

Figure 1:
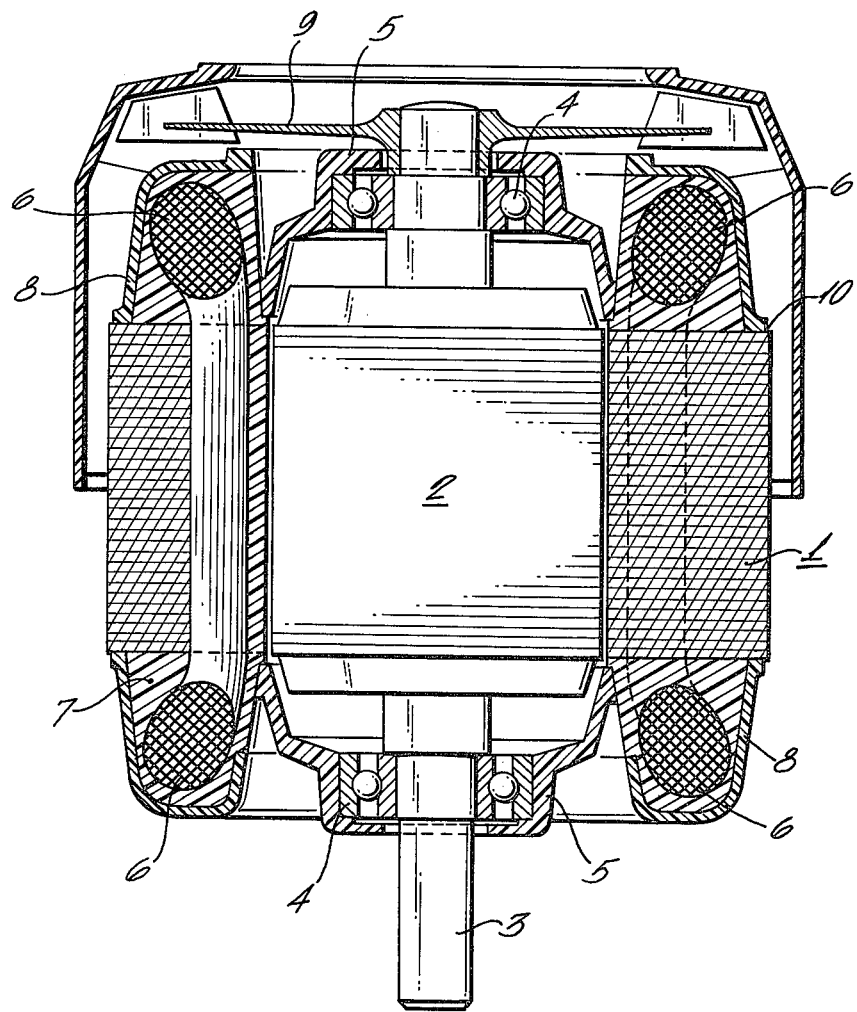
FIG. 1 shows in section an electric motor according to the invention.

On FIG. 1 the stator 1 is shown together with a conventional rotor 2. The rotor is via its shaft 3, bearings 4 and bearing shields 5 journalled at the inner side of the stator by means of moulded guide surfaces. Plastic mass 7 is moulded around the winding heads 6. The plastic mass is covered by the casings 8. A fan 9 for cooling is arranged bringing air to flow through the motor.

The two plastic casings 8 may be identical, but according to the invention, they may also be of different shape. It is important that these casings confine a space as small as possible around the winding heads as then the amount of moulding mass will be small. The plastic casings 8 may be axially divided, which permits introducing them from the side. A tighter connection between the casing and the winding head may then be obtained, which results in a smaller amount of plastic required between the winding head and the stator laminations. As appears from the drawing, the casings have a tight fit to the stator at its periphery 10. The casings 8 protect the windings, they act as fastening means and serve as moulds during the moulding of the stator windings.

Figure 2:
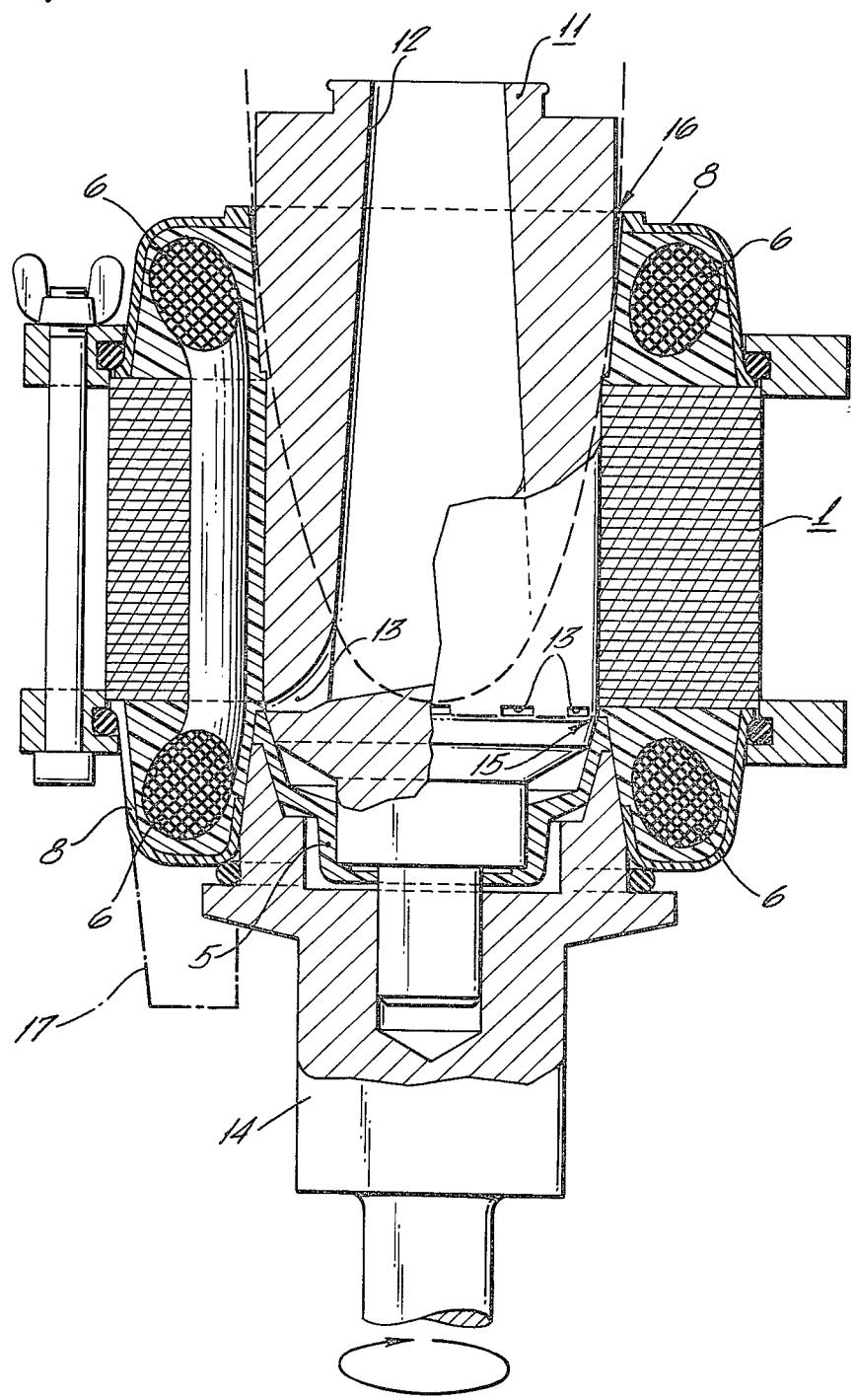
FIG. 2 shows in section the stator during the moulding.

A method for the production of the stator according to the invention is schematically shown in FIG. 2.

The stator 1, which in advance has been provided with windings 6, is also equipped with plastic casings 8 which are pressed together by suitable fastening means. Within the stator a hollow mandrel 11 having a central orifice 12 and outlet openings 13 for liquid plastic is arranged. At the inner end of the mandrel the bearing shield 5 is mounted. This is pressed against the mandrel by means of a tool 14. The mandrel is centered by the stator cavity and it is inserted so far into the stator that the shoulder 15 abuts against a stop at the inner edge of the stator. Therethrough the axial and radial positions of the bearing shield 5 are fixed.

The casings 8 are pressed, as shown on the figure, against the laminations and confine a cavity which, furthermore, is defined by the mandrel, the laminations, the tool 14 and the bearing shield 5.

During the moulding the moulding mass is introduced through the opening 12. The supply pipe shall end freely in this opening close to the outlet orifice. Therethrough one avoids direct contact between the supply pipe and the hot mandrel so that the plastic will not start geling in the pipe. Any risk of stopping up of the supply pipe does consequently not exist.

During the moulding the assembly is rotated and the plastic will then flow in through the openings 13 and will gradually fill up the whole mounding cavity until the plastic commences to flow out at the opening 16 at the upper and inner edge of the upper casing. When the plastic flows into the cavity, the air is pressed out as the plastic flows upwards. During the introduction the inner surface of the plastic will then have the shape of a paraboloid. The shape of this paraboloid is dependent of the speed of rotation, and this speed must be so adapted that the paraboloid finally will cut the touching line between the upper casing and the mandrel.

After having finished the moulding the mandrel is removed, whereby the ingates in the openings 13 are cut off.

The casings at the sides of the stator may be different. On FIG. 2 the lower casing is shown having an enlargement 17 which is designated by a dotted line. This enlargement may be an attachment to some apparatus or the like.

Figure 3:
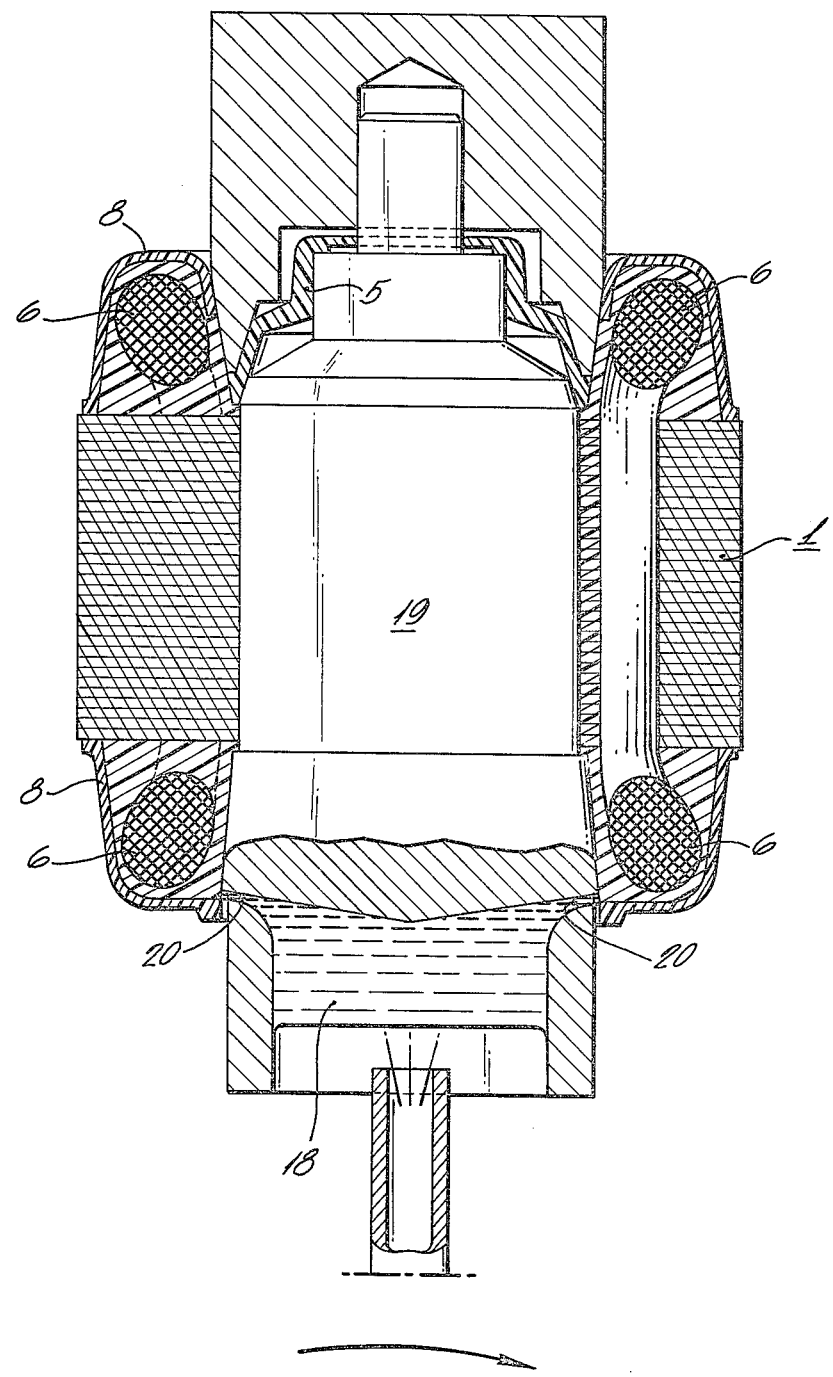
FIG. 3 shows an alternative production method.

On FIG. 3 a modification of the production method according to the invention is shown. The stator package prepared in advance is rotated around a center outside the stator package. The moulding mass 18 is supplied to that end, which is closest to the rotation center. The mandrel 19 may in this case be compact and have outlet openings 20 at the end towards the rotation center.

Figure 4:
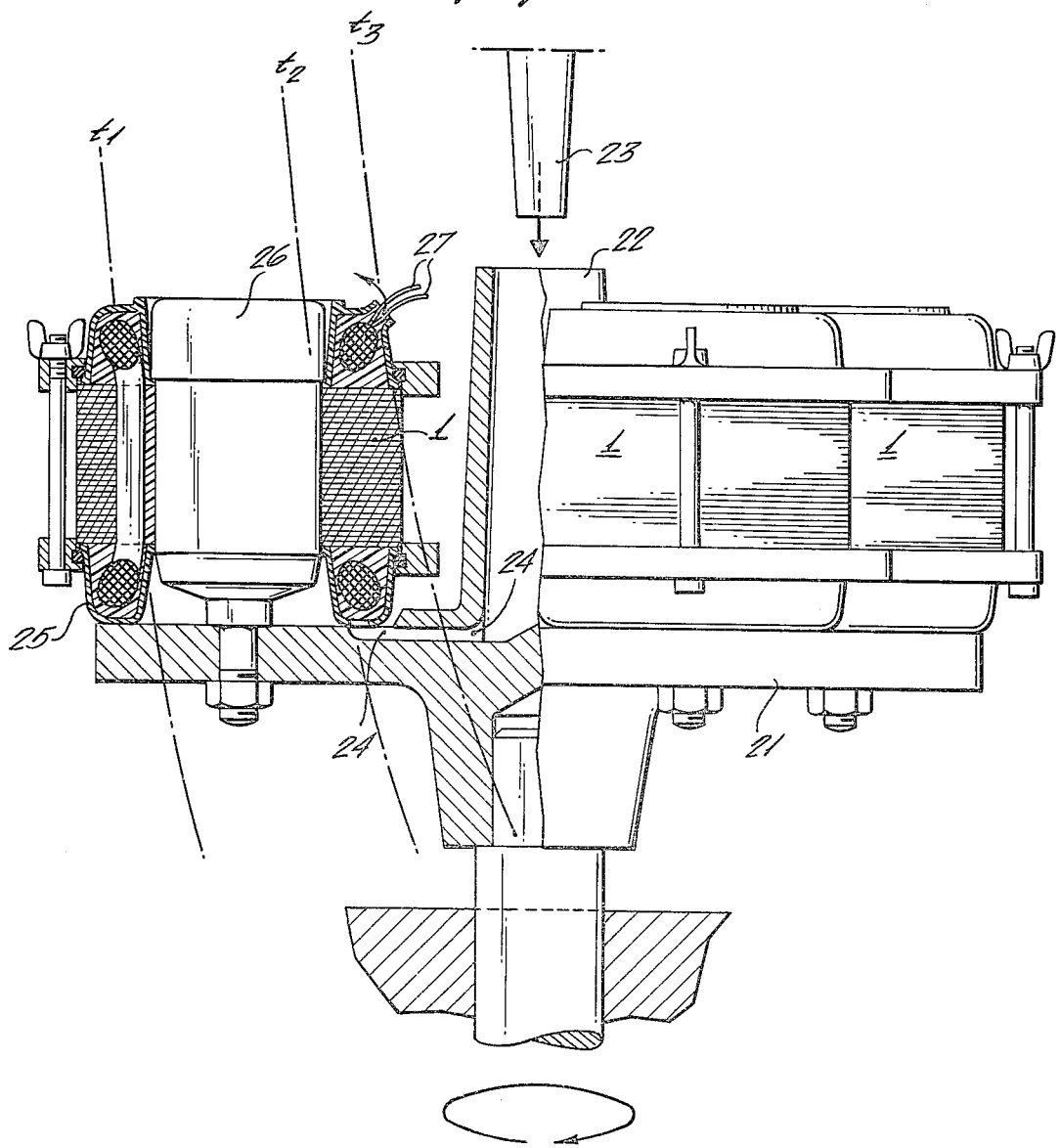
FIGS. 4 and 5 show partly in section further modifications of the invention.

On FIG. 4 a rotating disc 21 is shown having a central supply pipe 22 for liquid plastic coming from a mouth piece 23. Any direct contact between the pipe 22 and the mouth piece 23 does not exist, which means that the mouth piece 23 always will be completely emptied. Any cleaning of the pipe does, consequently not have to be done. The liquid plastic will flow out through channels 24 into the lower part of the stator through an inlet orifice in the casing 25. The stator is arranged around a mandrel 26 which is attached to the disc 21.

Due to the rotation the liquid plastic will get a paraboloidic surface which is shown by the dotted lines $T_1$, $T_2$ and $T_3$. The air in the stator will be forced out through the opening for the electric wires 27. This opening must, consequently, be so positioned on the paraboloid that the stator is completely filled by plastic when the air has been completely forced out.

A suitable number of stators may be attached to the rotating disc and moulded at the same time. After the filling-up of the stators the plastic is allowed to gel during a sufficiently long time, for instance 10 minutes, whereupon the stators are after-cured in an oven to obtain the full rigidity of the moulding mass.

Figure 5:
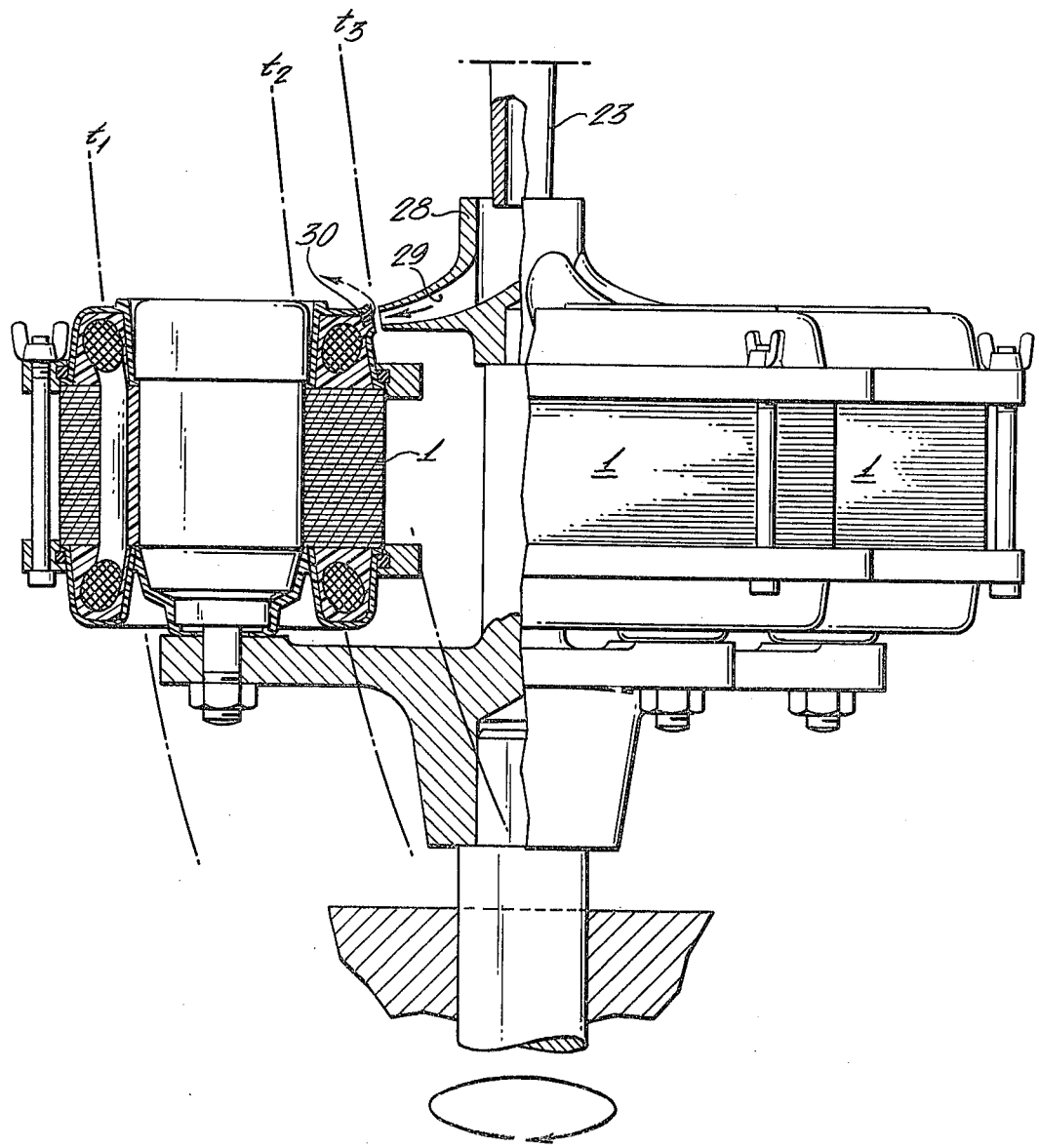

According to FIG. 5 the moulding of the stators is shown where the plastic is introduced at the upper end of the stator. The plastic may flow in from the mouth piece 23 into a centrally positioned, rotating filling device 28 having channels 29 ending in or immediately before the opening 30 in the stator. This opening, through which the electric wires shall be drawn, must be sufficiently wide to allow the liquid plastic to flow in at the same time as the air flows out without any hindrance. The advantage with this type of filling is that any ingate is not made and that the filling device will not be stopped up.

The method according to these two latter modifications has, compared to the two former modifications, the advantage that the mandrels have a very simple shape, which means a substantial saving in cost and further makes it possible to apply the moulding methods on stators having small cavity diameters. Further, through the location of the orifice for the out-flowing air, the upper casing may embrace the winding head also at the inner side which means that the risk for damages on the windings is reduced and that the attachment of the rear bearing is simplified.

Electric machines manufactured according to the method of the invention have several advantages.

Among the advantages which relate to the machine as such may be mentioned:

smallest possible outer dimensions and lowest weight by avoiding stator ring and big bearing shields, double isolation of the stator. Supreme impregnation of the stator windings, accurate centering of the bearing seats in relation to the stator cavity and consequently low vibration level, many possibilities to design the casings with mounting flanges, terminals or as parts of the apparatuses, more effective cooling of the stator windings then for conventional encapsulated cooled motors, as the cooling air has a direct contact with the stator iron and the winding heads as well as the fact that the space in the stator slots and the slot isolation is completely filled with heat-conducting, up to 70% mineral-filled moulding mass.

In those cases where the slot isolation consists of sintered epoxy powder, the heat conducting will be very good as the whole space between the winding wires and the slot will be filled with epoxy plastic having great heat-conductivity ability.

Compared to the other moulding methods where only one moulding mass is used for impregnating as well as making the bearing shields and fastening means, the present invention brings about great advantages as to the possibilities to choose the most suitable material in every part of the carrying and isolating parts and at the same time use the most appropriate production method. Thus, for the bearing shields, a high quality plastic material is chosen, which may be pressure-moulded to accurate dimensions and which has high dimension stability, high rigidity and good impact resistance, as, for instance, glass fiber reinforced curable plastic formed by a compression method.

For the casings a cheap thermoplastic material having high impact resistance is chosen, due to the stresses in fastening means and mechanical influence in common.

The casings are suitably made by injection moulding.

For the moulding mass itself which is the largest quantity in the volume, a material having good impregnating properties, good heat-conducting properties and a low price, for instance, epoxy plastics with 70% mineral fillers, is chosen.

The possibility to use soft magnetic fillers in the moulding mass and consequently fill the slots with magnetically conducting material results in a smoother magnetic field, decreased relative air gap (reduced Carter factor) and improved cooling due to the high heat-conducting property of the iron powder. All these factors promote an increase in efficiency and increase of the output of the motor.

The use of soft magnetic fillers in the moulding mass is permitted thanks to the fact that the casings are so close to the winding heads, that a minimum of moulding mass is required for filling the cavity.

This is a precaution with regard to the high price for the soft magnetic fillers and to avoid an unacceptable increase in the leakage reactance in the winding head caused by a large amount of magnetically conducting moulding mass around the winding heads.

The present invention gives also rise to some further advantages with regard to the manufacturing method itself:

all cutting treatment has been eliminated and has been replaced by plastic moulding resulting in cost reduction;

bandaging, phase-isolating and trimming up the winding head can be avoided and are replaced by the cheaper operation to mount the winding casing. The casing does also serve as a transport-cover for the windings during the transport from the winding machine to the moulding station.

very efficient use of the moulds compared to conventional moulding methods. Through the present invention it is possible in the complicated moulds for the winding casings and carriers to produce one or more details every 30th second by injection-moulding in thermo or curable plastic. The moulding of the windings that requires relative long time, 5–10 minutes, to make the impregnation of the winding wires complete, is carried out by using the simple and cheap mandrel. This results in a low mould cost per produced motor.

In conventional moulding methods, where impregnation as well as the forming of the carrying parts of the motor occurs in one and the same moulding operation, the impregnation moment decides the cycle time, about 10 minutes, and the production per mould will be low and the mould cost per motor high, when a mould, which shall form the whole stator's inner and outer shape, is complicated and expensive.

Of still greater importance is, however, the fact, that one, when producing according to the present invention, may change the length of the stator to fulfill varying demands on torque moment and out effect without changing anything else than the cylindrical part of the mandrel. The winding casings and bearing shields are not influenced by changes in the length of the stator.

This is the difference from the conventional plastic moulding methods in which every change in the length of the motor requires a new mould or substantial modification.

Compared to conventional moulding machines having the same capacity, 30–60 stators per hour, the moulding machine according to the present invention is extremely uncomplicated, reliable and cheap. Through the absence of mould halves which are to be opened, closed and electrically heated and filled under pressure or vacuum the moulding machine may simply be arranged as a round table having stationary feeding and taking out stations and stationary plastic preparing and moulding station as well as an oven for the geling. It is further a great advantage that there is no physical connection between the moulding mass in the preparing and dosing station and the hot mandrel. Thereby, the difficult problems for conventional moulding machines, namely, to prevent that the moulding mass gels in that supply vent which comes into contact with the mould, and which vent consequently is heated, will be eliminated. Further, the cleaning of mould halves from plastic remainders may be avoided.

By arranging the moulding machine as a round table with stepwise feeding and taking out the machine will suit well in a producton line. The working load on the personnel will be even, which is a great advantage compared to most types of moulding machines where all moulds have to be fed and shaped simultaneously and where the personnel can not be used during the period of 5–10 minutes, when filling and geling occurs.

No sealing problems exist in connection with the cable inlet, as this occurs at the surface of the rotation paraboloid, where atmosphere pressure exists.

The invention is not limited to the embodiment examples shown, but can be varied in different ways within the scope of the claims.

We claim:

1. A method for making a stator for an electric machine including a plurality of laminations forming a stack arranged to define a stator cavity and winding heads consisting of the steps of supporting casings in a position surrounding the winding heads in sealing relation with opposite ends of the lamination stack, positioning a mandrel in the stator cavity having locating means engageable with the stator stack and means on its outer surface to define axial and radial locating positions for bearing shields, supporting a bearing shield at one end of the mandrel having a circumferential edge portion communicating with one of said cavities, the casing, laminations and mandrel defining an enclosed cavity at one end of the stator stack, the casing, lamination, mandrel and bearing shield defining an enclosed cavity at the other end of the stator stack injecting a curable moulding material into the cavities by means of centrifugal force, and curing the moulding material.

2. A method as claimed in claim 1 wherein the casings are made of a shape retaining plastic and are united with the moulding material when it is cured.

3. A method as claimed in claim 1 including the step of rotating the stator about its central axis during injection of the moulding material.

4. A method as claimed in claim 1 including the step of rotating the stator around a central point located outside the stator during the injection of moulding material.

5. A method as claimed in claim 1 including the step of introducing the moulding material through the mandrel into the lower part of the stator, the air being pressed out through holes in one of the casings for electric wires.

6. A method as claimed in claim 1 wherein the moulding material is injected by feeding it through the mandrel into the part of the stator which is closest to the center of rotation.

7. A method as claimed in claim 1 including the step of rotating the stator around an axis parallel to and spaced from its central axis.

8. A method as claimed in claim 1 wherein the moulding material is injected by introducing the moulding material into the upper part of the stator via an air gap from a mouthpiece whereby air in the stator is forced out through the feeding orifice for the moulding material.

9. A method as claimed in claim 1 including the steps of mounting a plurality of stators on the periphery of a disclike support member and rotating the support member.

10. A method as claimed in claim 9 wherein the moulding material is introduced via channels in the support member.

11. A method for making a stator for an electric machine including a plurality of laminations forming a stack arranged to define a stator cavity and winding heads consisting of the steps of supporting casings in a position surrounding the winding heads in sealing relation with opposite ends of the lamination stack, positioning a hollow mandrel in the stator cavity having locating means engageable with the stator stack and means on its outer surface to define axial and radial locating positions for bearing shields, the casings, laminations and mandrel defining a pair of enclosed cavities at opposite ends of the stator stack, injecting a curable moulding material into the hollow central opening in the mandrel, rotating the assembly to effect flow of the moulding material through radial discharge openings in the mandrel to fill the cavities by centrifugal force, and curing the moulding material.

12. A method for making a stator for an electric machine including a plurality of laminations forming a stack arranged to define a stator cavity and winding heads consisting of the steps of supporting casings in a position surrounding the winding heads in sealing relation with opposite ends of the lamination stack, positioning a hollow mandrel in the stator cavity having locating means engageable with the stator stack and means on its outer surface to define axial and radial locating positions for bearing shields, supporting a bearing shield at one end of the mandrel having a circumferential edge portion communicating with one of said cavities the casings, laminations and mandrel defining a pair of enclosed cavities at opposite ends of the stator stack, injecting a curable moulding material into the hollow central opening in the mandrel, rotating the assembly to effect flow of the moulding material through radial discharge openings in the mandrel to fill the cavities by centrifugal force, and curing the moulding material.

* * * * *